May 29, 1956 L. W. ATCHISON 2,747,269
INSULATING STRUCTURES
Filed Sept. 27, 1952
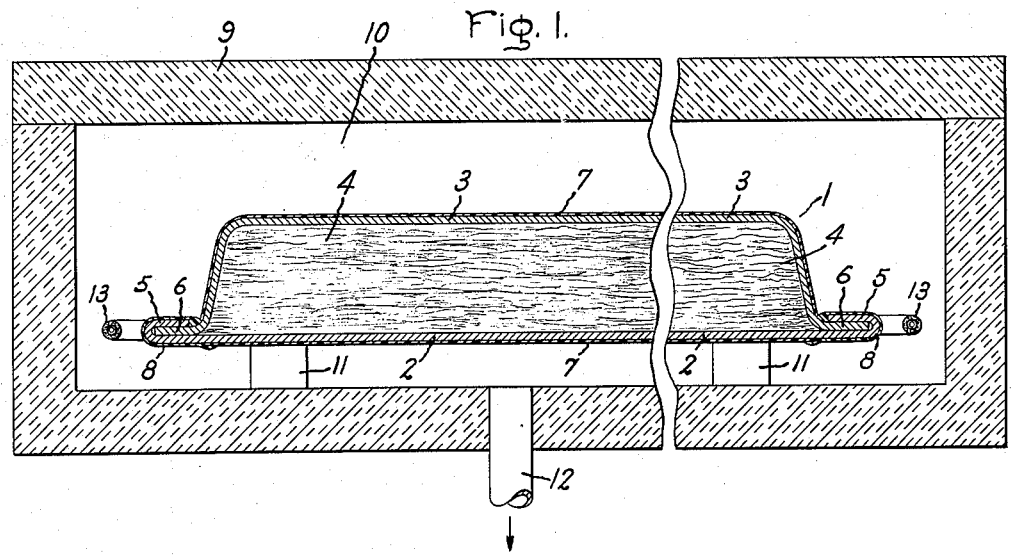
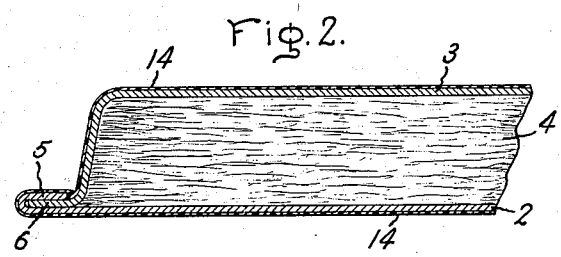
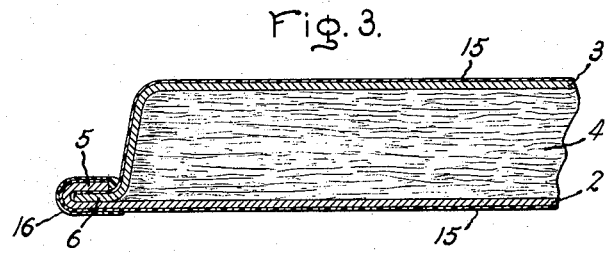
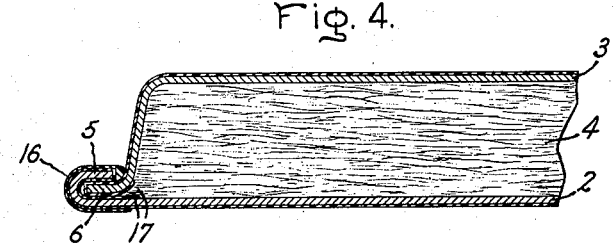
Inventor:
Leonard W. Atchison
by *Sheridan & Ryan*
His Attorney.

United States Patent Office 2,747,269
Patented May 29, 1956

2,747,269

INSULATING STRUCTURES

Leonard W. Atchison, Erie, Pa., assignor to General Electric Company, a corporation of New York Application September 27, 1952, Serial No. 311,921

9 Claims. (Cl. 29—455)

My invention relates to insulating structures and more particularly to methods for the manufacture thereof.

It has been found that vacuum insulated structures, for example, of the type described and claimed in the co-pending application of Herbert M. Strong and Francis P. Bundy, Serial No. 236,788, filed July 14, 1951, and assigned to the General Electric Company, the assignee of the present invention, provide substantial advantages for use in refrigerators and the like which require adequate thermal insulation. Such insulating structures or panels may include a metal envelope having arranged therein a filler material, such as glass fiber insulation, for supporting the walls of the envelope against the substantial atmospheric pressure. It is, of course, essential for the long-term maintenance of the thermal insulating properties of such panels that a perfect seal at the edges of the walls forming the panel be obtained so that there is no leakage of air or other gases into the interior of the panel. Such a perfect seal may be obtained, for example, by insuring that a perfect weld is secured between the adjacent edges of the panel walls. This requires extreme care in the manufacture of the panel to insure that the adjacent edges to be welded are free of contaminating materials and to insure that the welding operation is performed in such a manner that a continuous, perfect weld is obtained. In accordance with my invention, a process is provided whereby a perfect seal is obtained without the necessity of relying upon the welding operation for the securing and maintenance of this seal.

Accordingly, it is an object of my invention to provide an improved method for manufacturing a sealed envelope of the vacuum type.

It is another object of my invention to provide an improved arrangement for effecting sealing of the envelope.

It is a further object of my invention to provide an improved arrangement for sealing a metal envelope and minimizing corrosion thereof.

Further objects and advantages of my invention will become apparent as the following description proceeds, and the features of novelty which characterize my invention will be pointed out with particularity in the claims annexed to and forming part of this specification.

In carrying out the objects of my invention the two walls forming the envelope or panel are mechanically engaged or partially welded or both at the adjacent edges thereof. The partial weld, if employed, is such as to leave a plurality of relatively small gaps at the edges. The entire panel, or at least the edges thereof, is coated with porcelain enamel frit and is placed within a chamber arranged to be evacuated. During the evacuation process the panel, or at least the welded edges thereof, is maintained at a temperature below the firing temperature of the enamel. After the evacuation has been completed and while the panel remains within the chamber, the porcelain enamel frit is fired. Then the temperature is allowed to cool below the point at which the enamel solidifies so that the solidified enamel closes the gaps and maintains the vacuum within the panel.

For a better understanding of my invention reference may be had to the accompanying drawing in which Fig. 1 is a sectional elevation view, partly in section, illustrating somewhat schematically an embodiment of my invention; Fig. 2 is a sectional view of a portion of a panel or insulating structure illustrating a modified form of my invention; Fig. 3 is a view similar to Fig. 2 illustrating another modified form of my invention; and Fig. 4 is a view similar to Fig. 2 showing still another modified form of my invention.

Referring to Fig. 1, the panel or insulating structure 1 includes two complementary walls 2 and 3. In the form illustrated, the wall 3 is of generally inverted pan shape providing a space between the wall 3 and the wall 2. This space is filled with a filler material 4, such as glass fiber insulation, for supporting the walls 2 and 3 under the heavy atmospheric pressure after the panel has been evacuated. In order to hold the walls in proper relationship to form the completed panel, the edges 5 of the wall 2 are returned bent to overlap the edges 6 of the wall 3. The overlapping edges 5 are pressed firmly against the edges 6 to provide an initial mechanical engagement.

While reliance may be placed on the aforementioned overlapping edge engagement alone, in order to provide for further mechanical engagement and additional partial sealing of the interior of the envelope or panel 1, the edges 5 and 6 are then preferably partially welded in any suitable manner. For example, the edges may be spot-welded to assist in holding the walls in position and for partially sealing the envelope while at the same time leaving relatively small gaps or openings along the edges for communication between the interior of the panel and the exterior thereof. Alternatively, line or seam welding arranged to insure a plurality of relatively small gaps at the edges may be employed.

Prior to the assembly of the walls 2 and 3 to form the panel in the manner described above, the exterior surfaces of these walls are coated with porcelain enamel frit. The frit is wiped from the edges 5 and 6 leaving a coating on the major portion of the exterior surface of the walls, as indicated at 7. The walls are placed in an oven and the porcelain enamel frit is fired in a conventional manner to fuse the frit and provide the solid enamel coating on the walls, as indicated at 7.

After the panel 1 has been mechanically formed and partially welded in the manner described above, the edges thereof are coated with porcelain enamel frit 8. This frit covers the exposed edges and partially overlaps the edges of the previously fired coating 7. Before the porcelain enamel frit 8 is fired, the panel 1 is placed within an autoclave 9. Preferably the porcelain enamel frit 8 is heated to some temperature below the firing temperature before the panel is placed in the autoclave so as to remove the major portion of the water from the frit and thereby reduce the load on the evacuating system connected to the autoclave. The porcelain enamel frit, prior to firing, provides a relatively porous coating. The autoclave 9 includes a chamber 10 for receiving the panel. The panel may be supported within the autoclave in any suitable manner, for example, by blocks or supports 11.

A conduit 12 is connected in communication with the chamber 10 of the autoclave and this conduit is connected to a vacuum pump (not shown) for effecting removal of air from the chamber 10 and the reduction of the pressure therein to a high degree of vacuum. As the chamber 10 is evacuated, air is also withdrawn from the incompletely sealed interior of the panel 1 through the aforementioned gaps or openings at the edges of the panel. Since the enamel has not been fired and, as described above, provides a relatively thin porous coat, air flows from the interior of the panel through the aforementioned gaps and through the porous coating of enamel.

In the embodiment illustrated in Fig. 1, a heater 13, spaced slightly from the extremities of the edges 5 and 6 of the walls of the panel, is provided for supplying heat particularly to these edges 5 and 6. This heater 13 may be of the high frequency induction type so that the heat is concentrated at the edges in the region where it is needed for the purpose of effecting firing and fusing of the frit 8. The evacuation of the panel is, of course, completed before this firing of the frit 8 at the edges is carried out.

After the firing of the porcelain enamel frit 8 has been completed and while the vacuum is being maintained within the autoclave 9, the panel is then allowed to cool so that the temperature falls below that at which the porcelain enamel coating solidifies. If desired for more rapid cooling, suitable cooling coils could, of course, be provided within the chamber 10. Upon solidification, the porcelain enamel covers and closes the aforementioned gaps at the edges of the panel, thereby providing an effective seal for maintaining the required low pressure within the panel without the necessity of initially providing a perfect weld throughout the length of the adjacent edges of the panel walls.

The porcelain enamel, in addition to sealing the aforementioned gaps, is also effective for minimizing rusting of the walls 1 and 2. This minimization of rusting is particularly significant in the case of vacuum insulated structures, since if the corrosion proceeds to the extent of forming holes through the walls, the vacuum and the insulating effect attributable thereto is lost. In addition, the minimization of corrosion minimizes the production of hydrogen, which is one of the effects thereof, and hence, minimizes diffusion of this hydrogen through the walls into the interior of the panel. Such diffusion, of course, has a deleterious effect on the vacuum therein.

A modified form of my invention is shown in Fig. 2. In this form the bare walls 2 and 3 are assembled in the manner described above. This assembly may be effected entirely by the mechanical engagement of the overlapping edges or by the partial welding, as described above, or by a combination of these techniques. After the assembly of the walls 2 and 3 has been completed to form the panel, porcelain enamel frit is applied, as indicated at 14, to the entire panel including the entire exterior surface of the walls 2 and 3 and the region of the edges 5 and 6 thereof. As in the form previously described, the enamel frit is preferably heated to a temperature below the firing temperature to drive off the major portion of the water therein. The panel is then placed within an autoclave and evacuation is accomplished in the manner described in connection with the form shown in Fig. 1.

In this case, after evacuation has been completed, heat is applied to the entire surface of the panel for effecting firing of the porcelain enamel frit 14. This firing of the porcelain enamel frit may be accomplished by placing heating elements within the autoclave in the region of the entire exterior surface of the panel in a manner well known in the art for effecting firing of porcelain enamel frit. The assembly is then allowed to cool while maintaining the vacuum in the autoclave until the fused porcelain enamel has solidified to seal the aforementioned gaps.

A modified form of my invention is shown in Fig. 3. In the form there illustrated, a porcelain enamel coating 15 is applied to one surface of the walls 2 and 3 and is fired thereon before the assembly operation to form the panel is initiated. Unlike the form shown in Fig. 1, the porcelain enamel frit is not wiped from the edges 5 and 6 prior to firing. After the walls 2 and 3 are coated with porcelain enamel and fired, the wall 2 is bent in the manner previously described to provide the edges 5 overlapping the edges 6 of the wall 3. This overlapping forms a mechanical engagement between the walls 1 and 2 but allows a plurality of gaps at the edges 5 and 6 to afford passages for effecting evacuation of the panel. This bending of the edges 5 of the wall 2 also, of course, effects crazing of the porcelain enamel in this region.

In order to seal the aforementioned gaps and in order to cover the crazed portion and provide a pleasing finished appearance, porcelain enamel frit is then applied to a limited area in the region of the edges 5, 6, as indicated at 16. After heating below the firing temperature to remove the major portion of the water from the frit, the assembly is then placed in the autoclave as shown in Fig. 1 and the evacuation of the panel is effected. After the evacuation is completed, the edges 5 and 6 are heated in any suitable manner, as by the heater 13 shown in Fig. 1, to raise the porcelain enamel frit 16 to the firing temperature. The firing and fusing of the frit and the subsequent cooling and solidifying thereof while maintaining the aforementioned vacuum effects sealing of the gaps at the edges 5 and 6, thereby providing a vacuum tight panel.

Another modified form of my invention is shown in Fig. 4. The structure shown in Fig. 4 is similar to that described in Fig. 3 except that the walls 1 and 2 are coated before assembly with porcelain enamel not only on the exterior surfaces thereof but also on the portion of the interior surfaces in the region of the edges 5 and 6, as indicated at 17. After this pre-enameling operation, the walls 1 and 2 are assembled in the same manner as described in connection with Fig. 3 and porcelain enamel frit is applied at the edges thereof as indicated at 16 in the same manner. The evacuation and the firing of this porcelain enamel frit to complete the panel is carried out in the same manner as described in connection with Fig. 3.

While I have shown and described specific embodiments of my invention, I do not desire my invention to be limited to the particular arrangements shown and described, and I intend by the appended claims to cover all modifications within the spirit and scope of my invention.

What I claim as new and desire to secure by Letters Patent of the United States is:

1. The method of manufacturing a sealed panel of the vacuum type which comprises providing two complementary walls, partially welding the adjacent edges of said walls together for mechanical engagement and for providing an incomplete seal having relatively small gaps therein, coating at least said edges of said walls with porcelain enamel frit to cover said gaps, placing said panel in a chamber, evacuating said chamber whereby the interior of said panel is evacuated through said gaps and through said frit, heating said frit to its firing temperature, and allowing said panel to cool below the solidification temperature of said enamel while maintaining said panel in said evacuated chamber whereby said solidified enamel fills said gaps and effects sealing of said panel.

2. The method of manufacturing a sealed panel of the vacuum type which comprises providing two complementary walls, deforming the edges of at least one of said walls to provide mechanical engagement of the adjacent edges of said walls to form an envelope having relatively small gaps at said edges, coating at least said edges of said walls with porcelain enamel frit to cover said gaps, placing said panel in a chamber, evacuating said chamber whereby the interior of said panel is evacuated through said gaps and through said frit, heating said frit to its firing temperature, and allowing said panel to cool below the solidification temperature of said enamel while maintaining said panel in said evacuated chamber whereby said solidified enamel fills said gaps and effects sealing of said panel.

3. The method of manufacturing a sealed panel of the vacuum type which comprises providing two complementary walls, deforming the edges of at least one of said walls to provide mechanical engagement of the adjacent edges of said walls for forming an envelope, spot welding said edges together to provide an incomplete seal having relatively small gaps therein, coating at least said edges of said walls with porcelain enamel frit to cover said gaps, placing said panel in a chamber, evacuating said chamber whereby the interior of said panel is evacuated through said gaps and through said frit, heating said frit to its firing temperature, and allowing said panel to cool below the solidification temperature of said enamel while maintaining said panel in said evacuated chamber whereby said solidified enamel fills said gaps and effects sealing of said panel.

4. The method of manufacturing a sealed panel of the vacuum type which comprises providing two complementary walls, partially welding the adjacent edges of said walls together for mechanical engagement and for providing an incomplete seal having relatively small gaps therein, coating said edges of said walls with porcelain enamel frit to cover said gaps, placing said panel in a chamber, evacuating said chamber whereby the interior of said panel is evacuated through said gaps and through said frit, heating said edges of said panel to raise said frit to its firing temperature, and allowing said panel to cool below the solidification temperature of said enamel while maintaining said panel in said evacuated chamber whereby said solidified enamel fills said gaps and effects sealing of said panel.

5. The method of manufacturing a sealed panel of the vacuum type which comprises providing two complementary walls, bending the edges of one of said walls to overlap and engage the corresponding edges of the other of said walls for mechanical engagement therewith and for providing at said edges an incomplete seal having relatively small gaps therein, coating at least said edges of said walls with porcelain enamel frit to cover said gaps, placing said panel in a chamber, evacuating said chamber whereby the interior of said panel is evacuated through said gaps and through said frit, heating said frit to its firing temperature, and allowing said panel to cool below the solidification temperature of said enamel while maintaining said panel in said evacuated chamber whereby said solidified enamel fills said gaps and effects sealing of said panel.

6. The method of manufacturing a sealed panel of the vacuum type which comprises providing two complementary walls, bending the edges of one of said walls to overlap and engage the corresponding edges of the other of said walls for mechanical engagement therewith, partially welding said overlapping edges together to provide an incomplete seal having relatively small gaps therein, coating at least said edges of said walls with porcelain enamel frit to cover said gaps, placing said panel in a chamber, evacuating said chamber whereby the interior of said panel is evacuated through said gaps and through said frit, heating said frit to its firing temperature, and allowing said panel to cool below the solidification temperature of said enamel while maintaining said panel in said evacuated chamber whereby said solidified enamel fills said gaps and effects sealing of said panel.

7. A method of manufacturing a sealed panel of the vacuum type which comprises providing two complementary walls, coating one surface of each of said walls with porcelain enamel frit, wiping said frit from the edges of each of said walls, heating said frit to its firing temperature, deforming the edges of at least one of said walls to provide mechanical engagement of the adjacent edges of said walls to form an envelope having relatively small gaps at said edges, coating said edges of said walls with porcelain enamel frit partially overlapping the edges of said first-mentioned coating and covering said gaps, placing said panel in a chamber, evacuating said chamber whereby the interior of said panel is evacuated through said gaps and through said last-named frit, heating said last-named frit to its firing temperature, and allowing said panel to cool below the solidification temperature of said last-named frit while maintaining said panel in said evacuated chamber whereby said solidified last-named frit fills said gaps and effects sealing of said panel.

8. A method of manufacturing a sealed panel of the vacuum type which comprises providing two complementary walls, coating one surface of each of said walls with porcelain enamel frit, heating said frit to its firing temperature, deforming the edges of one of said walls to provide mechanical engagement of the adjacent edges of said walls to form an envelope having relatively small gaps at said edges, said deformation causing some crazing of the porcelain enamel at said edges of said one of said walls, coating said deformed edges of said one of said walls with porcelain enamel frit covering said crazed porcelain enamel and overlapping said gaps, placing said panel in a chamber, evacuating said chamber whereby the interior of said panel is evacuated through said gaps and through said last-named frit, heating said last-named frit to its firing temperature, and allowing said panel to cool below the solidification temperature of said last-named frit while maintaining said panel in said evacuated chamber whereby said solidified last-named frit fills said gaps and effects sealing of said panel.

9. A method of manufacturing a sealed panel of the vacuum type which comprises providing two complementary walls, coating the outer surface of each of said walls with porcelain enamel frit, coating the edges of the inner surface of each of said walls with porcelain enamel frit, heating said frit to its firing temperature, deforming the edges of one of said walls to provide mechanical engagement of the adjacent edges of said walls to form an envelope having relatively small gaps at said edges, said deformation causing some crazing of the porcelain enamel frit of said one of said walls, coating said deformed edges of said one of said walls with porcelain enamel frit covering at least the exposed crazed porcelain enamel and overlapping said gaps, placing said panel in a chamber, evacuating said chamber whereby the interior of said panel is evacuated through said gaps and through said last-named frit, heating said last-named frit to its firing temperature, and allowing said panel to cool below the solidification temperature of said last-named frit while maintaining said panel in said evacuated chamber whereby said solidified last-named frit fills said gaps and effects sealing of said panel.

References Cited in the file of this patent

UNITED STATES PATENTS

| Number | Name | Date |
|---|---|---|
| 831,527 | Landsberger | Sept. 18, 1906 |
| 1,186,572 | Guibert | June 13, 1916 |
| 1,458,586 | McCrosson | June 12, 1923 |
| 1,898,977 | Comstock | Feb. 21, 1933 |
| 2,023,354 | Cope | Dec. 3, 1935 |
| 2,229,526 | Schabacker | Jan. 21, 1941 |
| 2,253,384 | Lown | Aug. 19, 1941 |
| 2,348,696 | Schabacker | May 9, 1944 |
| 2,391,436 | Miskella | Dec. 25, 1945 |